United States Patent [19]
Sanvitale

[11] 3,850,216
[45] Nov. 26, 1974

[54] TIRE ATTACHMENT FOR TRACTION ON ICE OR SNOW

[76] Inventor: Salvatore Sanvitale, via Buccella 6, Trento, Italy

[22] Filed: Nov. 5, 1973

[21] Appl. No.: 412,979

[30] Foreign Application Priority Data
Nov. 9, 1972 Italy.............................. 82225/72

[52] U.S. Cl................. 152/225, 152/208, 152/218, 152/241
[51] Int. Cl.... B60c 27/04, B60c 27/10, B60c 27/20
[58] Field of Search.................... 152/208, 225–230, 152/233, 241, 242, 217, 218

[56] References Cited
UNITED STATES PATENTS

| | | | |
|---|---|---|---|
| 1,307,445 | 6/1919 | Kelly.................................. | 152/330 |
| 1,536,967 | 5/1925 | Palao................................. | 152/225 |
| 2,679,882 | 6/1954 | Rich................................... | 152/229 |
| 3,437,121 | 4/1969 | Strapko et al. .................... | 152/225 |
| 3,732,910 | 5/1973 | Mathews............................ | 152/225 |

Primary Examiner—Drayton E. Hoffman

[57] ABSTRACT

Tire attachment for traction on icy or snow-covered roads comprising a plurality of traction members having one hooked terminal for peripherical engagement of the tire's surface and one bar-like terminal laterally and radially directed to the center of the wheel of a vehicle, the hooked terminal being securely held by means of at least one inflatable tube positioned against the inner surface of the rim of the wheel.

4 Claims, 8 Drawing Figures

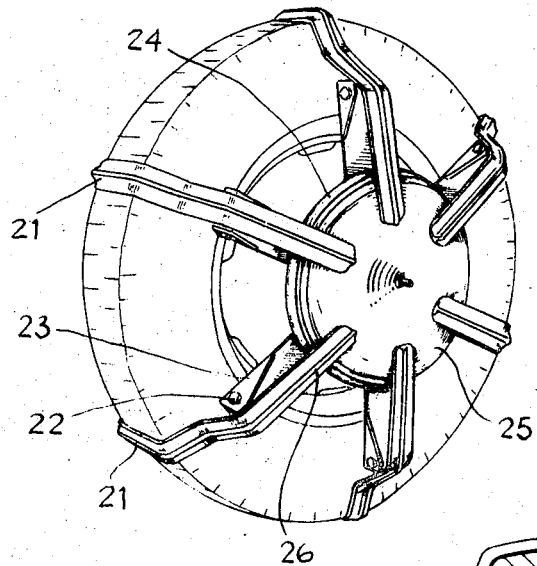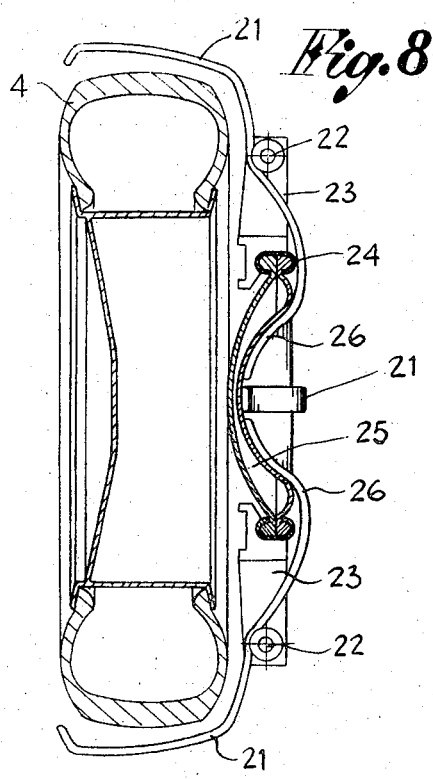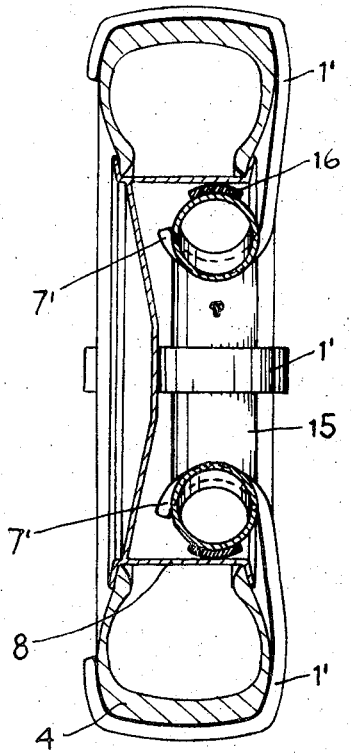

TIRE ATTACHMENT FOR TRACTION ON ICE OR SNOW

FIELD OF THE INVENTION

The present invention relates to a vehicular tire attachment for traction on ice or snow-covered roads.

PRIOR ART

Present day tire attachments consist of either steel studs applied directly to the tires or chains manually wrapped around the tires of the vehicle. The former must be installed one at a time by means of special machines and, once applied, are usually left in place for the entire life of the tire. Furthermore, they cannot be applied to tires which do not have the required tread depth, thus limiting further their utilization. The latter, while removable at one's desire, necessitate strenuous manual work and skill in their application to the tires. Furthermore, the chain links are quite susceptible of breakage with resultant damage to the fenders and underbody of the vehicle.

SUMMARY OF THE INVENTION

An object of the invention is the elimination of these conventional disadvantages by providing a device attachment for tires which is easily and rapidly mounted and detached, regardless of the tire involved and regardless of the vehicle in question, truck or automobile.

Another object of the invention is to provide an attachment for tires for traction on ice or snow, which may be attached to and detached from the tire by any person without the need of any tools.

Briefly stated, the present invention provides for an attachment for tires, for the purpose indicated, which attachment comprises a plurality of hooked members transversely engaging the road-contacting portion of the tire and laterally and radially extending toward the center of the wheel. Each member is individually secured to the wheel by means of an inflatable tube which engages the inner portion of the rim of the wheel, so as to block securely the said member onto the tire.

According to a variant, the said hooked members are blocked securely to the wheel by means of an inflatable tube which engages concurrently all of the individual members, thus being concentrically positioned within the rim of the wheel, or being coaxially positioned with respect to the wheel.

THE DRAWINGS

A better understanding of the invention will become apparent from the following detailed description thereof with reference to the accompanying drawings, in which:

FIG. 6 is a sectional view of a variant of the means for blocking the hooked traction members onto the wheel; and FIGS. 7 and 8 are perspective and, respectively, diametric sectional views of an assembled wheel with traction members conformant to a structural variant and particularly suitable for automobiles, rather than trucklike vehicles.

DETAILED DESCRIPTION OF THE INVENTION

Figure 1:
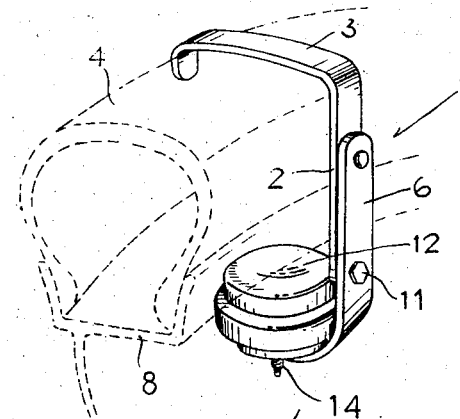
FIGS. 1 and 2 are perspective views of the traction members of the invention, showing, respectively, one and two hooks.
Figure 2:
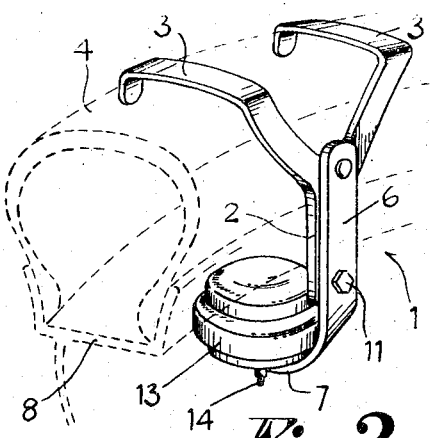

The tire attachment of the present invention comprises a plurality of hooked traction members 1, each of which includes a stem 2 provided with one or two bent terminals 3 — see FIGS. 1 and, respectively, 2 —, which terminals engage transversely the periphery of the tire 4 of the wheel 5. The stem 2 of each member 1 extends laterally and radially with respect to the tire 4 and to said stem there is attached a bar 6 which is bent at one end toward the center of the wheel and terminates in a horizontal portion 7 facing the inside of the rim 8.

Bar 6 is provided with a reference pin 9 which engages a corresponding opening 10 provided on the stem 2 and is fixed therein by means of a bolt 11. On the stem 2 and on the bar 6 there may be provided a plurality of openings, at predetermined distances, so as to elect the positioning of the pin 9 and of the bolt 11. This arrangement results in a more versatile adjustment of the tire attachment to the wheel.

Figure 3:
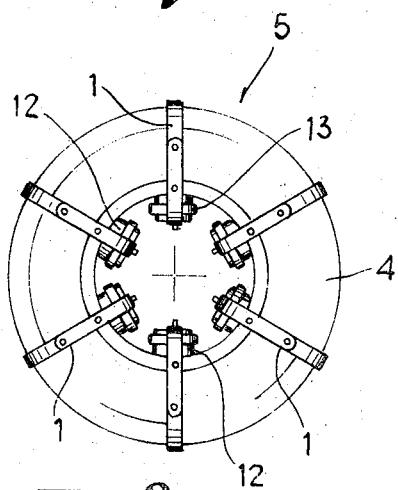
FIG. 3 is a schematic frontal view of a vehicular tire with the hooked members in assembled position.
Figure 4:
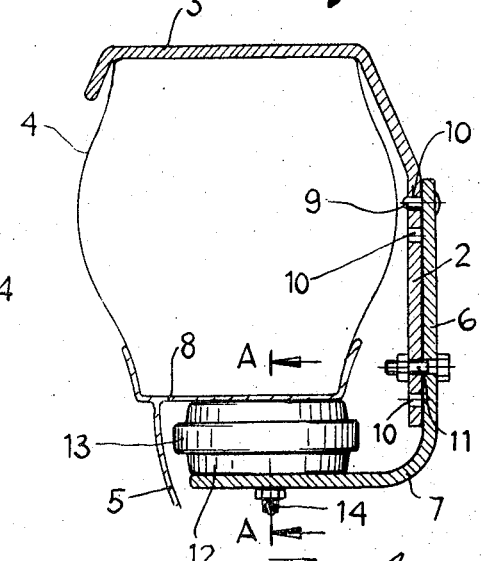
FIG. 4 is a radial sectional view of a wheel with an assembled hooked traction member of FIGS. 1 or 2.
Figure 5:
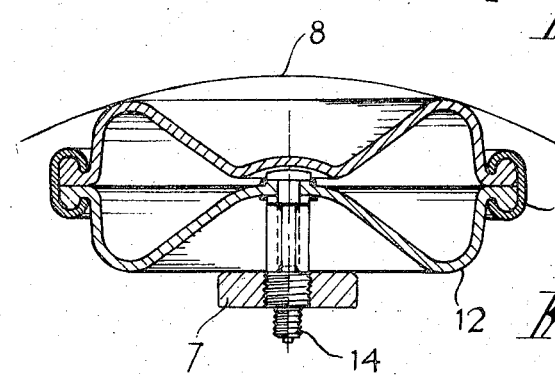
FIG. 5 is a sectional view obtained from FIG. 4 along lines A—A thereof.

On the horizontal portion 7 of the bar 6 there is mounted and blocked in position an inflatable tube 12. This tube is circumferentially engaged by a retaining ring 13 and is provided furthermore with an air inlet 14. The tube 12 is engaged between the inner surface of the rim of the wheel and the horizontal portion 7 of the bar 6, so as to effect, once inflated, a tensile force upon the bar 6 sufficient to hold the hooked traction terminals 3 of the attachment securely engaged to the surface of the tire 4 — see FIGS. 3 and 4.

Alternatively, the plurality of traction members 1, when positioned on the tire, instead of being secured individually by means of individual inflatable tubes 12, may be concurrently engaged by means of a single inflatable tube 15 of toroidal shape — see FIG. 6. This single tube 15 is, like the individual tubes, engaged between the inner surface of the rim 8 of the wheel and the horizontal portion 7' of the bars of the members 1'. Preferably, between this single tube 15 and the rim there is interposed a metal ring 16 which serves as a guide for the tube 15. Also in this variant, the inflation of the tube effects a tensile force on all of the hooked terminals 3 toward the center of the wheel and, thus, results in their secure blocking against the periphery of the tire 4 — see FIG. 6.

In accordance with a structural variant of the invention and with reference to FIGS. 7 and 8, each hooked terminal 21 is pivotable at 22 on a support 23, which support is connected, together with the supports of all other terminals, to the holding ring 24 of an inflatable tube 25, which tube in turn is positioned axially with respect to the wheel shaft 5.

The hooked terminals are provided with individual lever extensions 26, the extremities of which are coordinated with the tube 25 and engaged thereby. Following the inflation of the tube 25, these lever extensions 26 are displaced laterally so that the traction members effect an angular displacement about the pivots 22 and come to engage with their hooked terminals 21 the periphery of the tire 4 and remain securely blocked thereto until the tube 25 is deflated.

It is to be noted that the solution afforded by the tire attachment shown in FIGS. 1 through 6 is particularly suited for truck tires or tires for heavy vehicles. Conversely, the device according to FIGS. 7 and 8 is particularly indicated for conventional automobile tires.

The air required for inflating the tube or tubes may be readily and advantageously derived from the respective tires, if tubeless, or from their respective tubes. This is carried out by connecting by means of suitable conduit the valves of the inflatable tubes of this invention with the valve of the vehicular tire.

Particularly worth noting is the fact that the hooked terminals 3, in the event of lack of snow, do not shift but, upon contacting the hard road surface, penetrate the tread of the tire, in a resilient manner, and thus retain their correct position on the surface of the tire.

What is claimed is:

1. Tire attachment for traction on ice or snow which comprises: a plurality of traction members transversely engaging the road-surface of the tire and extending laterally and radially toward the center of the wheel; at least one inflatable tube for blocking securely said members onto said tire surface, said tube engaging the inner surface of the wheel's rim, said tube having an air inlet valve for inflation purposes.

2. The attachment according to claim 1, wherein each of said members comprises a stem; a hooked terminal at one end of said stem for engaging the tire surface; an extension bar attached to the other extremity of said stem, said bar having a bent portion and a horizontal portion facing toward the wheel's rim; said inflatable tube being mounted upon said horizontal portion; and a circumferential holding ring positioned between said horizontal portion and the wheel's rim.

3. The attachment according to claim 2, wherein a single tube is provided connected to the horizontal portion of each of said bars; said tube being annularly shaped and positioned between said horizontal portions and the wheel's rim; said tube being further provided with a circumferential holding ring resting against the wheel's rim.

4. The attachment according to claim 2, wherein said hooked terminal of said traction member is pivoting about a support, said support being connected to a peripherical holding ring, said ring holding said inflatable tube axially with respect to the wheel's shaft; said hooked terminal having a lever extension engaging said tube and positioned so as to cause angular displacements of said hooked terminal and, respectively, holding said hooked terminal securely against the surface of the tire.

* * * * *